United States Patent
Jones et al.

(10) Patent No.: US 9,208,006 B2
(45) Date of Patent: Dec. 8, 2015

(54) RECOVERY MATURITY MODEL (RMM) FOR READINESS-BASED CONTROL OF DISASTER RECOVERY TESTING

(71) Applicant: SunGard Availability Services, LP, Wayne, PA (US)

(72) Inventors: Steven Jones, Chadds Ford, PA (US); Jose Maldonado, Haddonfield, NJ (US)

(73) Assignee: SUNGARD AVAILABILITY SERVICES, LP, Wayne, PA (US)

( * ) Notice: Subject to any disclaimer, the term of this patent is extended or adjusted under 35 U.S.C. 154(b) by 177 days.

(21) Appl. No.: 13/792,713

(22) Filed: Mar. 11, 2013

(65) Prior Publication Data

US 2014/0258782 A1    Sep. 11, 2014

(51) Int. Cl.
 *G06F 11/00* (2006.01)
(52) U.S. Cl.
 CPC .................. *G06F 11/008* (2013.01)
(58) Field of Classification Search
 USPC .......................................................... 714/33
 See application file for complete search history.

(56) References Cited

U.S. PATENT DOCUMENTS

| | | | |
|---|---|---|---|
| 7,430,744 B2 | 9/2008 | Straube et al. | |
| 7,587,665 B2 | 9/2009 | Crow et al. | |
| 7,770,058 B2 * | 8/2010 | Phan ............................ | 714/6.12 |
| 7,945,537 B2 * | 5/2011 | Balasubramanian et al. | 707/675 |
| 7,992,031 B2 * | 8/2011 | Chavda et al. ..................... | 714/2 |
| 8,166,396 B2 | 4/2012 | Farn | |
| 8,176,145 B1 * | 5/2012 | Stender et al. ................. | 709/219 |
| 8,239,751 B1 | 8/2012 | Rochelle et al. | |
| 8,296,615 B2 * | 10/2012 | Rajamony et al. ............. | 714/745 |
| 2004/0139303 A1 * | 7/2004 | Margolus et al. ............. | 712/220 |
| 2007/0027973 A1 | 2/2007 | Stein et al. | |
| 2007/0067435 A1 | 3/2007 | Landis et al. | |
| 2007/0250738 A1 * | 10/2007 | Phan ................................. | 714/6 |
| 2008/0155441 A1 | 6/2008 | Long et al. | |
| 2008/0255895 A1 * | 10/2008 | Rajamony et al. ................ | 705/7 |
| 2010/0049723 A1 | 2/2010 | Aebig et al. | |
| 2010/0077257 A1 * | 3/2010 | Burchfield et al. ............. | 714/37 |
| 2011/0126197 A1 | 5/2011 | Larsen et al. | |
| 2011/0161851 A1 | 6/2011 | Barber et al. | |
| 2013/0262638 A1 * | 10/2013 | Kumarasamy et al. ........ | 709/221 |
| 2013/0262801 A1 * | 10/2013 | Sancheti et al. .............. | 711/162 |
| 2014/0215255 A1 * | 7/2014 | Zaheer ............................. | 714/1 |

OTHER PUBLICATIONS

Disaster Recovery Manager—Online Disaster Recovery Plan Management, <http://www.disasterrecoverymanager.com/default.asp> Feb. 2, 2013, 1 page.

(Continued)

*Primary Examiner* — Kamini Patel
(74) *Attorney, Agent, or Firm* — Cesari and McKenna, LLP

(57) ABSTRACT

A Recovery Maturity Model (RMM) is used to determine whether a particular Information Technology (IT) production environment can be expected, with some level of confidence, to successfully execute a test for disaster recovery (DR). The RMM provides a quantitative analysis in terms of the extent to which best practices are seen to have been implemented as a set of categories for elements of the environment and multiple elements for each category. A summation of the scoring elements, which may be a weighted summation, results in an overall quantitative metric which is then used to control whether or not testing will proceed.

15 Claims, 18 Drawing Sheets

(56) References Cited

OTHER PUBLICATIONS

Disaster Recovery Manager—Disaster Readiness Assessment, Disaster Recovery Plan Management—Free Disaster Readiness Assessment <http://www.disasterrecoverymanager.com/disaster_readiness_assessment.asp> Feb. 12, 2013, 1 page.

Disaster Recovery Manager—Disaster Readiness Assessment, Disaster Recovery Manager—"Help Yourself" <http://www.disasterrecoverymanager.com/disaster_readiness_assessment_page_1.asp?p=new> Feb. 12, 2013, 2 pages.

"Disaster Recovery"—Wikipedia, the free encyclopedia, en.wikipedia.org/wiki/Disaster_recovery Feb. 12, 2013, 5 pages.

* cited by examiner

FIG. 3A

| SUNGARD AVAILABILITY SERVICES | | RECOVERY MATURITY MODEL | SEE BEST PRACTICES |
|---|---|---|---|
| 1 REMEDIATION REQUIRED | | CUSTOMER ABC | |
| 2 ATTENTION REQUIRED | 77.3% | | MATURITY SCALE-PROBABILITY INDICATOR OF A SUCCESSFUL DR TEST (SCORE 0-100) |
| 3 TEST READY | | | -MATURITY SCORE (80+) HIGH PROBABILITY OF A SUCCESSFUL DR TEST |
| | RMM INDEX: | | -MATURITY SCORE (60-80) LOW PROBABILITY OF SUCCESSFUL DR TEST |
| | | | -MATURITY SCORE (<60) ATTENTION IS REQUIRED PRIOR TO CONDUCTING DR TEST |

LOGO HERE

| | CCR/ PLAYBOOK % COMPLETED | | BACKUP ASSESSMENT | | RECOVERY STRATEGY DEFINED | | CUSTOMER'S PROCEDURE DEVELOPED | | CUSTOMER DR KIT COMPLETENESS | | KNOWLEDGE TRANSFER COMPLETED | | CHANGE MANAGEMENT | | RTO/RPO ACHIEVABLE | | ISSUES/RISKS |
|---|---|---|---|---|---|---|---|---|---|---|---|---|---|---|---|---|---|
| ADD A CATEGORY | WEIGHT | | WEIGHT | | WEIGHT | | WEIGHT | | WEIGHT | | WEIGHT | | WEIGHT | | WEIGHT | | |
| REMOVE A CATEGORY | 40 | | 15 | | 10 | | 5 | | 8 | | 7 | | 5 | | 10 | | |
| CATEGORY | ENTER SCORE | | ENTER SCORE | | ENTER SCORE | | ENTER SCORE | | ENTER SCORE | | ENTER SCORE | | ENTER SCORE | | ENTER SCORE | | |
| BUSINESS APPLICATION | 1 | | 2 | | 3 | | 2 | | 1 | | 3 | | 3 | | 3 | | |
| BACKUP TECHNOLOGY | 3 | | 3 | | 3 | | 1 | | 3 | | 1 | | 1 | | 1 | | |
| NETWORK | 3 | | 2 | | 1 | | 3 | | 3 | | 3 | | 2 | | | | |
| ESX/vCENTER CONFIGS | 3 | | 1 | | 2 | | 2 | | 1 | | 3 | | 2 | | | | |
| WINDOWS VIRTUAL MACHINES | 3 | | 3 | | 3 | | 3 | | 3 | | 2 | | 2 | | | | |
| WINDOWS PHYSICAL CONFIGS | 3 | | 3 | | 3 | | 1 | | 1 | | 1 | | 3 | | | | |
| LINUX VIRTUAL MACHINES | 2 | | 3 | | 1 | | 3 | | 3 | | 3 | | 1 | | | | |
| LINUX PHYSICAL CONFIGS | 2 | | 2 | | 2 | | 2 | | 2 | | 2 | | 2 | | | | |
| SUN CONFIGS | 3 | | 1 | | 1 | | 1 | | 3 | | 1 | | 3 | | | | |
| HP CONFIGS | 3 | | 3 | | 3 | | 3 | | 3 | | 3 | | 3 | | | | |
| AIX CONFIGS | 3 | | 2 | | 2 | | 2 | | 2 | | 2 | | 2 | | | | |
| AS400 CONFIGS | 3 | | 1 | | 2 | | 3 | | 3 | | 3 | | 3 | | | | |
| MAINFRAME CONFIGS | 3 | | 3 | | 3 | | 3 | | 3 | | 3 | | 3 | | | | |
| SQL CONFIGS | 3 | | 3 | | 3 | | 3 | | 3 | | 3 | | 3 | | | | |
| AVERAGE | 2.90 | | 2.07 | | 2.21 | | 1.71 | | 1.57 | | 1.86 | | 1.71 | | 2.00 | | |

TO FIG 3B ⇒

FROM FIG3A

| INSTRUCTIONS: | 1. EACH CATEGORY/ELEMENT IS SCORED FROM 1-3, BASED ON SCORING CRITERIA DEFINED BY THE COMMENT WITHIN THE CELL, THE AVERAGE OF EACH ELEMENT IS CALCULATED BASED ON THE RATING OF ALL CATEGORIES.<br>2. ALL CLIENT PLATFORMS MUST BE REPRESENTED WITHIN RMM<br>3. ADD CATEGORIES AS NEEDED USING THE ADD A CATEGORY BUTTON<br>4. REMOVE CATEGORIES AS NEEDED USING THE REMOVE A CATEGORY BUTTON<br>5. A VALUE MUST BE ENTERED FOR EVERY CELL.<br>6. COMMENTS MUST BE INCLUDED IN THE ISSUES/RISKS CELL TO SHOW STRENTGHS AND IMPROVEMENT OPPORTUNITIES<br>NOTE: EVERY COMPONENT OF THE RMM MODEL IS WEIGHTED. DO NOT REMOVE BUSINESS APPLICATION, BACKUP TECHNOLOGY, NETWOKR AS THEY ARE REQUIRED CATEGORIES |
|---|---|

*FIG. 3B*

RMM DETAILED SCORING INSTRUCTIONS

| CATEGORY | % PLAYBOOK COMPLETED WT 50 ENTER SCORE | BACKUP ASSESSMENT WT 15 ENTER SCORE | ELEMENTS — RECOVERY STRATEGY DEFINED WT 15 ENTER SCORE | CUSTOMER'S PROCEDURE DEVELOPED WT 8 ENTER SCORE | CUSTOMER DR KIT COMPLETENESS WT 6 ENTER SCORE | KNOWLEDGE TRANSFER COMPLETED WT 5 ENTER SCORE | CHANGE MANAGEMENT WT 5 ENTER SCORE |
|---|---|---|---|---|---|---|---|
| BUSINESS APPLICATION | HAS THE BUSINESS APP REVIEW TAB BEEN COMPLETED TO REFLECT ALL BUSINESS APPLICATIONS AND THEIR DEPENDENCIES? | HAS THE BACKUP ASSESSMENT BEEN COMPLETED FOR ALL BUSINESS APPLICATIONS? HAS THE BACKUP STRATEGY BEEN CLEARLY DEFINED? HOW WELL DOES THE STRATEGY ALIGN WITH BEST PRACTICES? | HAS THE RECOVERY STRATEGY BEEN DEFINED FOR ALL BUSINESS APPLICATIONS? HAVE THE RTO AND RPO BEEN CLEARLY STATED? HAS THE RECOVERY ORDER BEEN STATED FOR ALL APPLICATIONS? HOW WELL DOES THE STRATEGY ALIGN WITH BEST PRACTICES? | ARE THERE CURRENTLY ANY CUSTOMER-DEVELOPED PROCEDURES FOR THE BACKUP AND RECOVERY OF THE BUSINESS APPLICATIONS? | IS THE CUSTOMER'S DR KIT COMPLETE FOR ALL BUSINESS APPLICATIONS? THE DR KIT SHOULD CONTAIN INSTALL MEDIA, LICENSE KEYS, VENDOR SUPPORT CONTACT INFORMATION, APPLICATION AND SERVER AUTHENTICATION INFORMATION, RECOVERY PLAN WITH WELL-DEFINED GOALS AND OBJECTIVES, AND ANY OTHER RELATED DOCUMENTATION AND PREPARATION. | HAS ALL INFORMATION PERTAINING TO THE BUSINESS APPLICATIONS BEEN COMMUNICATED TO SUNGARD? | ARE ALL CHANGES TO BUSINESS APPLICATIONS COMMUNICATED IN A REGULAR CHANGE MANAGEMENT FORMAT? |
| NETWORK | HAVE BOTH THE NETWORK TAB AND THE DOMAIN INFORMATION TAB BEEN COMPLETED? | HAS THE BACKUP ASSESSMENT BEEN COMPLETED FOR ALL NETWORK DEVICES AND SEGMENTS? HAS THE BACKUP STRATEGY BEEN CLEARLY DEFINED? HOW WELL DOES THE STRATEGY ALIGN WITH BEST PRACTICES? | HAS THE RECOVERY STRATEGY BEEN DEFINED FOR ALL NETWORK DEVICES AND SEGMENTS? HAVE THE RTO AND RPO BEEN CLEARLY STATED? HAS THE RECOVERY ORDER BEEN STATED FOR ALL DEVICES AND SEGMENTS? HOW WELL DOES THE STRATEGY ALIGN WITH BEST PRACTICES? | ARE THERE CURRENTLY ANY CUSTOMER-DEVELOPED PROCEDURES FOR THE BACKUP AND RECOVERY OF THE NETWORK DEVICES AND SEGMENTS? | IS THE CUSTOMER'S DR KIT COMPLETE FOR ALL NETWORK DEVICES AND SEGMENTS? THE DR KIT SHOULD CONTAIN INSTALL MEDIA, LICENSE KEYS, VENDOR SUPPORT CONTACT INFORMATION, APPLICATION AND SERVER AUTHENTICATION INFORMATION, RECOVERY PLAN WITH WELL-DEFINED GOALS AND OBJECTIVES, AND ANY OTHER RELATED DOCUMENTATION AND PREPARATION. | HAS ALL INFORMATION PERTAINING TO ALL NETWORK DEVICES AND SEGMENTS BEEN COMMUNICATED TO SUNGARD? | ARE ALL CHANGES TO ALL NETWORK DEVICES AND SEGMENTS COMMUNICATED IN A REGULAR CHANGE MANAGEMENT FORMAT? |

FIG. 4-1

| | | | | |
|---|---|---|---|---|
| BACKUP TECHNOLOGY | HAS THE BACKUP ASSESSMENT TAB BEEN COMPLETED? | HAS THE BACKUP ASSESSMENT BEEN COMPLETED FOR ALL BACKUP TECHNOLOGIES? HAS THE BACKUP STRATEGY BEEN CLEARY DEFINED? HOW WELL DOES THE STRATEGY ALIGN WITH BEST PRACTICES? | HAS THE RECOVERY STRATEGY BEEN DEFINED FOR ALL BACKUP TECHNOLOGIES? HAVE THE RTO AND RPO BEEN CLEARLY STATED? HAS THE RECOVERY ORDER BEEN STATED FOR ALL TECHNOLOGIES? HOW WELL DOES THE STRATEGY ALIGN WITH BEST PRACTICES? | ARE THERE CURRENTLY ANY CUSTOMER-DEVELOPED PROCEDURES FOR LEVERAGING THE BACKUP TECHNOLOGIES? | IS THE CUSTOMER'S DR KIT COMPLETE FOR ALL BACKUP TECHNOLOGIES? FOR EACH TECHNOLOGY THE DR KIT SHOULD CONTAIN INSTALL MEDIA, LICENSE KEYS, VENDOR SUPPORT CONTACT INFORMATION, APPLICATION AND SERVER AUTHENTICATION INFORMATION, RECOVERY PLAN WITH WELL-DEFINED GOALS AND OBJECTIVES, AND ANY OTHER RELATED DOCUMENTATION AND PREPARATION. | HAS ALL INFORMATION PERTAINING TO ALL BACKUP TECHNOLOGIES BEEN COMMUNICATED TO SUNGARD? | ARE ALL CHANGES TO ALL BACKUP TECHNOLOGIES COMMUNICATED IN A REGULAR CHANGE MANAGEMENT FORMAT? |
| ESX/vCENTER CONFIGS | HAVE BOTH THE ESX HOST CONFIGS TAB AND VMWARE CLUSTER CONFIGS TAB BEEN COMPLETED? | HAS THE BACKUP ASSESSMENT BEEN COMPLETED FOR ALL ESX AND/OR vCENTER CONFIGURATIONS? HAS THE BACKUP STRATEGY BEEN CLEARLY DEFINED? HOW WELL DOES THE STRATEGY ALIGN WITH BEST PRACTICES? | HAS THE RECOVERY STRATEGY BEEN DEFINED FOR ALL ESX/vCENTER CONFIGURATIONS? HAVE THE RTO AND RPO BEEN CLEARLY STATED? HAS THE RECOVERY ORDER BEEN STATED FOR ALL APPLICATIONS? HOW WELL DOES THE STRATEGY ALIGN WITH BEST PRACTICES? | ARE THERE CURRENTLY ANY CUSTOMER-DEVELOPED PROCEDURES FOR THE BACKUP AND RECOVERY OF THE VMWARE ENVIRONMENT? | IS THE CUSTOMER'S DR KIT COMPLETE FOR THE VMWARE ENVIRONMENT? DR KIT SHOULD CONTAIN INSTALL MEDIA, LICENSE KEYS, VENDOR SUPPORT CONTACT INFORMATION, APPLICATION AND SERVER AUTHENTICATION INFORMATION, RECOVERY PLAN WITH WELL-DEFINED GOALS AND OBJECTIVES, AND ANY OTHER RELATED DOCUMENTATION AND PREPARATION. | HAS ALL INFORMATION PERTAINING TO THE VMWARE ENVIRONMENT BEEN COMMUNICATED TO SUNGARD? THIS INFORMATION WILL BE RECORDED ON THE ESX HOST CONFIGS TAB AND THE VMWARE CLUSTER CONFIGS TAB. | ARE ALL CHANGES TO THE VMWARE ENVIRONMENT COMMUNICATED IN A REGULAR CHANGE MANAGEMENT FORMAT? |

FROM FIG 4-2A

| WINDOWS VIRTUAL MACHINES | HAS THE WINDOWS VIRTUAL MACHINE TAB BEEN COMPLETED? | HAS THE BACKUP ASSESSMENT BEEN COMPLETED FOR ALL WINDOWS VIRTUAL MACHINES? HAS THE BACKUP STRATEGY BEEN CLEARLY DEFINED? HOW WELL DOES THE STRATEGY ALIGN WITH BEST PRACTICES? | HAS THE RECOVERY STRATEGY BEEN DEFINED FOR ALL WINDOWS VIRTUAL MACHINES? HAVE THE RTO AND RPO BEEN CLEARLY STATED? HAS THE RECOVERY ORDER BEEN STATED FOR ALL APPLICATIONS? HOW WELL DOES THE STRATEGY ALIGN WITH BEST PRACTICES? | ARE THERE CURRENTLY ANY CUSTOMER-DEVELOPED PROCEDURES FOR BACKING UP AND RECOVERING ALL WINDOWS VMs? | IS THE CUSTOMER'S DR KIT COMPLETE FOR ALL WINDOWS VMs? DR KIT SHOULD CONTAIN INSTALL MEDIA, LICENSE KEYS, VENDOR SUPPORT CONTACT INFORMATION, APPLICATION AND SERVER AUTHENTICATION INFORMATION, RECOVERY PLAN WITH WELL-DEFINED GOALS AND OBJECTIVES, AND ANY OTHER RELATED DOCUMENTATION AND PREPARATION. | HAS ALL INFORMATION PERTAINING TO ALL WINDOWS VMs BEEN COMMUNICATED TO SUNGARD? | ARE ALL CHANGES TO ALL WINDOWS VMs COMMUNICATED IN A REGULAR CHANGE MANAGEMENT FORMAT? |

*FIG. 4-2B*

| | | | | | | |
|---|---|---|---|---|---|---|
| WINDOWS PHYSICAL CONFIGS | HAS THE WINDOWS PHYSICAL TAB BEEN COMPLETED? | HAS THE BACKUP ASSESSMENT BEEN COMPLETED FOR ALL WINDOWS PHYSICAL CONFIGURATIONS? HAS THE BACKUP STRATEGY BEEN CLEARY DEFINED? HOW WELL DOES THE STRATEGY ALIGN WITH BEST PRACTICES? | HAS THE RECOVERY STRATEGY BEEN DEFINED FOR ALL WINDOWS PHYSICAL CONFIGURATIONS? HAVE THE RTO AND RPO BEEN CLEARLY STATED? HAS THE RECOVERY ORDER BEEN STATED FOR ALL APPLICATIONS? HOW WELL DOES THE STRATEGY ALIGN WITH BEST PRACTICES? | ARE THERE CURRENTLY ANY CUSTOMER-DEVELOPED PROCEDURES FOR THE BACKUP AND RECOVERY OF ALL WINDOWS PHYSICAL SYSTEMS? | IS THE CUSTOMER'S DR KIT COMPLETE FOR ALL WINDOWS PHYSICAL SYSTEMS? DR KIT SHOULD CONTAIN INSTALL MEDIA, LICENSE KEYS, VENDOR SUPPORT CONTACT INFORMATION, APPLICATION AND SERVER AUTHENTICATION INFORMATION, RECOVERY PLAN WITH WELL-DEFINED GOALS AND OBJECTIVES, AND ANY OTHER RELATED DOCUMENTATION AND PREPARATION. | HAS ALL INFORMATION PERTAINING TO ALL WINDOWS PHYSICAL SYSTEMS BEEN COMMUNICATED TO SUNGARD? | ARE ALL CHANGES TO ALL WINDOWS PHYSICAL SYSTEMS COMMUNICATED IN A REGULAR CHANGE MANAGEMENT FORMAT? |
| LINUX PHYSICAL CONFIGS | HAVE THE LINUX TAB BEEN COMPLETED? | HAS THE BACKUP ASSESSMENT BEEN COMPLETED FOR ALL LINUX PHYSICAL CONFIGURATIONS? HAS THE BACKUP STRATEGY BEEN CLEARY DEFINED? HOW WELL DOES THE STRATEGY ALIGN WITH BEST PRACTICES? | HAS THE RECOVERY STRATEGY BEEN DEFINED FOR ALL LINUX PHYSICAL CONFIGURATIONS? HAVE THE RTO AND RPO BEEN CLEARLY STATED? HAS THE RECOVERY ORDER BEEN STATED FOR ALL APPLICATIONS? HOW WELL DOES THE STRATEGY ALIGN WITH BEST PRACTICES? | ARE THERE CURRENTLY ANY CUSTOMER-DEVELOPED PROCEDURES FOR THE BACKUP AND RECOVERY OF LINUX PHYSICAL SYSTEMS? | IS THE CUSTOMER'S DR KIT COMPLETE FOR ALL LINUX PHYSICAL SYSTEMS? DR KIT SHOULD CONTAIN INSTALL MEDIA, LICENSE KEYS, VENDOR SUPPORT CONTACT INFORMATION, APPLICATION AND SERVER AUTHENTICATION INFORMATION, RECOVERY PLAN WITH WELL-DEFINED GOALS AND OBJECTIVES, AND ANY OTHER RELATED DOCUMENTATION AND PREPARATION. | HAS ALL INFORMATION PERTAINING TO THE LINUX PHYSICAL SYSTEMS BEEN COMMUNICATED TO SUNGARD? | ARE ALL CHANGES TO ALL LINUX PHYSICAL SYSTEMS COMMUNICATED IN A REGULAR CHANGE MANAGEMENT FORMAT? |

FROM FIG 4-3A

| LINUX VIRTUAL MACHINES | HAS THE LINUX VIRTUAL MACHINES TAB BEEN COMPLETED? | HAS THE BACKUP ASSESSMENT BEEN COMPLETED FOR ALL LINUX VIRTUAL MACHINES? HAS THE BACKUP STRATEGY BEEN CLEARLY DEFINED? HOW WELL DOES THE STRATEGY ALIGN WITH BEST PRACTICES? | HAS THE RECOVERY STRATEGY BEEN DEFINED FOR ALL LINUX VIRTUAL MACHINES? HAVE THE RTO AND RPO BEEN CLEARLY STATED? HAS THE RECOVERY ORDER BEEN STATED FOR ALL APPLICATIONS? HOW WELL DOES THE STRATEGY ALIGN WITH BEST PRACTICES? | ARE THERE CURRENTLY ANY CUSTOMER-DEVELOPED PROCEDURES FOR ALL LINUX VMs? | IS THE CUSTOMER'S DR KIT COMPLETE FOR ALL LINUX VMs? DR KIT SHOULD CONTAIN INSTALL MEDIA, LICENSE KEYS, VENDOR SUPPORT CONTACT INFORMATION, APPLICATION AND SERVER AUTHENTICATION INFORMATION, RECOVERY PLAN WITH WELL-DEFINED GOALS AND OBJECTIVES, AND ANY OTHER RELATED DOCUMENTATION AND PREPARATION. | HAS ALL INFORMATION PERTAINING TO ALL LINUX VMs BEEN COMMUNICATED TO SUNGARD? | ARE ALL CHANGES TO ALL LINUX VMs COMMUNICATED IN A REGULAR CHANGE MANAGEMENT FORMAT? |

FIG. 4-3B

| | | | | | |
|---|---|---|---|---|---|
| SUN CONFIG | HAS THE SUN CONFIG TAB BEEN COMPLETED? | HAS THE BACKUP ASSESSMENT BEEN COMPLETED FOR ALL SUN CONFIGURATIONS? HAS THE BACKUP STRATEGY BEEN CLEARY DEFINED? HOW WELL DOES THE STRATEGY ALIGN WITH BEST PRACTICES? | HAS THE RECOVERY STRATEGY BEEN DEFINED FOR ALL SUN CONFIGURATIONS? HAVE THE RTO AND RPO BEEN CLEARLY STATED? HAS THE RECOVERY ORDER BEEN STATED FOR ALL APPLICATIONS? HOW WELL DOES THE STRATEGY ALIGN WITH BEST PRACTICES? | ARE THERE CURRENTLY ANY CUSTOMER-DEVELOPED PROCEDURES FOR THE BACKUP AND RECOVERY OF SUN? | IS THE CUSTOMER'S DR KIT COMPLETE FOR SUN? DR KIT SHOULD CONTAIN INSTALL MEDIA, LICENSE KEYS, VENDOR SUPPORT CONTACT INFORMATION, APPLICATION AND SERVER AUTHENTICATION INFORMATION, RECOVERY PLAN WITH WELL-DEFINED GOALS AND OBJECTIVES, AND ANY OTHER RELATED DOCUMENTATION AND PREPARATION. | HAS ALL INFORMATION PERTAINING TO THE SUN BEEN COMMUNICATED TO SUNGARD? | ARE ALL CHANGES TO SUN COMMUNICATED IN A REGULAR CHANGE MANAGEMENT FORMAT? |
| HP CONFIGS | HAVE THE HPUX TAB BEEN COMPLETED? | HAS THE BACKUP ASSESSMENT BEEN COMPLETED FOR ALL HPUX CONFIGURATIONS? HAS THE BACKUP STRATEGY BEEN CLEARY DEFINED? HOW WELL DOES THE STRATEGY ALIGN WITH BEST PRACTICES? | HAS THE RECOVERY STRATEGY BEEN DEFINED FOR ALL HPUX CONFIGURATIONS? HAVE THE RTO AND RPO BEEN CLEARLY STATED? HAS THE RECOVERY ORDER BEEN STATED FOR ALL APPLICATIONS? HOW WELL DOES THE STRATEGY ALIGN WITH BEST PRACTICES? | ARE THERE CURRENTLY ANY CUSTOMER-DEVELOPED PROCEDURES FOR THE BACKUP AND RECOVERY OF HPUX? | IS THE CUSTOMER'S DR KIT COMPLETE FOR HPUX? DR KIT SHOULD CONTAIN INSTALL MEDIA, LICENSE KEYS, VENDOR SUPPORT CONTACT INFORMATION, APPLICATION AND SERVER AUTHENTICATION INFORMATION, RECOVERY PLAN WITH WELL-DEFINED GOALS AND OBJECTIVES, AND ANY OTHER RELATED DOCUMENTATION AND PREPARATION. | HAS ALL INFORMATION PERTAINING TO HPUX BEEN COMMUNICATED TO SUNGARD? | ARE ALL CHANGES TO HPUX COMMUNICATED IN A REGULAR CHANGE MANAGEMENT FORMAT? |

FROM FIG 4-4A

| AIX CONFIGS | HAS THE AIX TAB BEEN COMPLETED? | HAS THE BACKUP ASSESSMENT BEEN COMPLETED FOR ALL AIX CONFIGURATIONS? HAS THE BACKUP STRATEGY BEEN CLEARLY DEFINED? HOW WELL DOES THE STRATEGY ALIGN WITH BEST PRACTICES? | HAS THE RECOVERY STRATEGY BEEN DEFINED FOR ALL AIX CONFIGURATIONS? HAVE THE RTO AND RPO BEEN CLEARLY STATED? HAS THE RECOVERY ORDER BEEN STATED FOR ALL APPLICATIONS? HOW WELL DOES THE STRATEGY ALIGN WITH BEST PRACTICES? | ARE THERE CURRENTLY ANY CUSTOMER-DEVELOPED PROCEDURES FOR THE BACK UP AND RECOVERY OR AIX? | IS THE CUSTOMER'S DR KIT COMPLETE FOR AIX? DR KIT SHOULD CONTAIN INSTALL MEDIA, LICENSE KEYS, VENDOR SUPPORT CONTACT INFORMATION, APPLICATION AND SERVER AUTHENTICATION INFORMATION, RECOVERY PLAN WITH WELL-DEFINED GOALS AND OBJECTIVES, AND ANY OTHER RELATED DOCUMENTATION AND PREPARATION. | HAS ALL INFORMATION PERTAINING AIX BEEN COMMUNICATED TO SUNGARD? | ARE ALL CHANGES TO AIX COMMUNICATED IN A REGULAR CHANGE MANAGEMENT FORMAT? |

FIG. 4-4B

| | | | | | |
|---|---|---|---|---|---|
| AS400 CONFIGS | HAS THE AS400 CONFIG TAB BEEN COMPLETED? | HAS THE BACKUP ASSESSMENT BEEN COMPLETED FOR ALL AS400 CONFIGURATIONS? HAS THE BACKUP STRATEGY BEEN CLEARY DEFINED? HOW WELL DOES THE STRATEGY ALIGN WITH BEST PRACTICES? | HAS THE RECOVERY STRATEGY BEEN DEFINED FOR AS400 CONFIGURATIONS? HAVE THE RTO AND RPO BEEN CLEARLY STATED? HAS THE RECOVERY ORDER BEEN STATED FOR ALL APPLICATIONS? HOW WELL DOES THE STRATEGY ALIGN WITH BEST PRACTICES? | ARE THERE CURRENTLY ANY CUSTOMER-DEVELOPED PROCEDURES FOR THE BACKUP AND RECOVERY OF AS400? | IS THE CUSTOMER'S DR KIT COMPLETE FOR AS400? DR KIT SHOULD CONTAIN INSTALL MEDIA, LICENSE KEYS, VENDOR SUPPORT CONTACT INFORMATION, APPLICATION AND SERVER AUTHENTICATION INFORMATION, RECOVERY PLAN WITH WELL-DEFINED GOALS AND OBJECTIVES, AND ANY OTHER RELATED DOCUMENTATION AND PREPARATION. | HAS ALL INFORMATION PERTAINING TO AS400 BEEN COMMUNICATED TO SUNGARD? | ARE ALL CHANGES TO AS400 ENVIRONMENT COMMUNICATED IN A REGULAR CHANGE MANAGEMENT FORMAT? |
| MAINFRAME CONFIGS | HAVE THE MAINFRAME TAB BEEN COMPLETED? | HAS THE BACKUP ASSESSMENT BEEN COMPLETED FOR ALL MAINFRAME CONFIGURATIONS? HAS THE BACKUP STRATEGY BEEN CLEARY DEFINED? HOW WELL DOES THE STRATEGY ALIGN WITH BEST PRACTICES? | HAS THE RECOVERY STRATEGY BEEN DEFINED FOR ALL MAINFRAME CONFIGURATIONS? HAVE THE RTO AND RPO BEEN CLEARLY STATED? HAS THE RECOVERY ORDER BEEN STATED FOR ALL APPLICATIONS? HOW WELL DOES THE STRATEGY ALIGN WITH BEST PRACTICES? | ARE THERE CURRENTLY ANY CUSTOMER-DEVELOPED PROCEDURES FOR THE BACKUP AND RECOVERY OF MAINFRAME? | IS THE CUSTOMER'S DR KIT COMPLETE FOR MAINFRAME? DR KIT SHOULD CONTAIN INSTALL MEDIA, LICENSE KEYS, VENDOR SUPPORT CONTACT INFORMATION, APPLICATION AND SERVER AUTHENTICATION INFORMATION, RECOVERY PLAN WITH WELL-DEFINED GOALS AND OBJECTIVES, AND ANY OTHER RELATED DOCUMENTATION AND PREPARATION. | HAS ALL INFORMATION PERTAINING TO MAINFRAME BEEN COMMUNICATED TO SUNGARD? | ARE ALL CHANGES TO MAINFRAME COMMUNICATED IN A REGULAR CHANGE MANAGEMENT FORMAT? |
| AVERAGE | AVERAGE: THIS IS THE UNWEIGHTED AVERAGE SCORE FOR ANY RATED CATEGORY | | | | | | |

FIG. 4-5

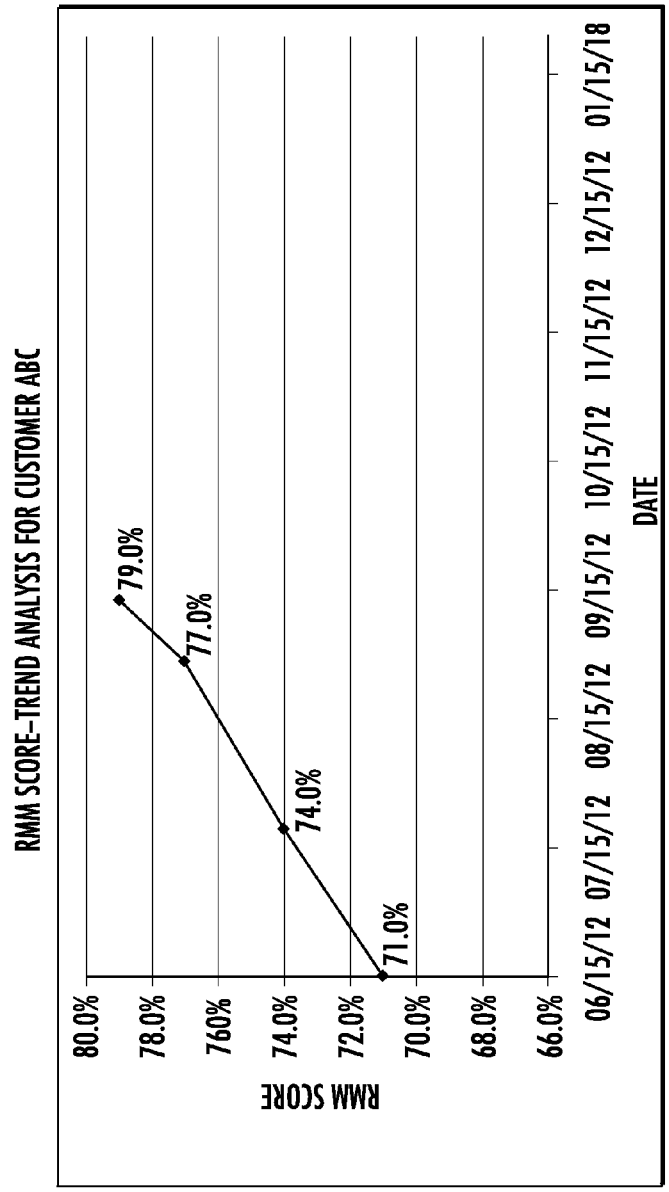

BACKUP & RECOVERY BEST PRACTICES

| COMPANY 1 BEST PRACTICES.PDF<br>◌<br>DOUBLE-CLICK FILE ABOVE TO OPEN | COMPANY 2 BEST PRACTICES.PDF<br>◌<br>DOUBLE-CLICK FILE ABOVE TO OPEN | COMPANY 3 BEST PRACTICES.PDF<br>◌<br>DOUBLE-CLICK FILE ABOVE TO OPEN | COMPANY 4 BEST PRACTICES.PDF<br>◌<br>DOUBLE-CLICK FILE ABOVE TO OPEN | COMPANY 5 BEST PRACTICES.PDF<br>◌<br>DOUBLE-CLICK FILE ABOVE TO OPEN |
|---|---|---|---|---|
| COMPANY 6 BEST PRACTICES.PDF<br>◌<br>DOUBLE-CLICK FILE ABOVE TO OPEN | COMPANY 7 BEST PRACTICES.PDF<br>◌<br>DOUBLE-CLICK FILE ABOVE TO OPEN | COMPANY 8 BEST PRACTICES.PDF<br>◌<br>DOUBLE-CLICK FILE ABOVE TO OPEN | COMPANY 9 BEST PRACTICES.PDF<br>◌<br>DOUBLE-CLICK FILE ABOVE TO OPEN | COMPANY 10 BEST PRACTICES.PDF<br>◌<br>DOUBLE-CLICK FILE ABOVE TO OPEN |
| COMPANY 11 BEST PRACTICES.PDF<br>◌<br>DOUBLE-CLICK FILE ABOVE TO OPEN | COMPANY 12 BEST PRACTICES.PDF<br>◌<br>DOUBLE-CLICK FILE ABOVE TO OPEN | COMPANY 13 BEST PRACTICES.PDF<br>◌<br>DOUBLE-CLICK FILE ABOVE TO OPEN | DOUBLE-CLICK FILE ABOVE TO OPEN | DOUBLE-CLICK FILE ABOVE TO OPEN |

*FIG. 7*

| RECOVERY MATURITY ASSESSMENT–HIGH LEVEL ESTIMATION & SCORING ||||
|---|---|---|
| QUESTIONS BELOW HAVE BEEN OBTAINED FROM THE RECOVERY MATURITY MODEL (RMM) | SCORE | SCORING CRITERIA |
| BACKUP AND RECOVERY ASSESSMENT | | |
| BACKUP ASSESSMENT<br>-HAS A BACKUP & RESTORE STRATEGY BEEN DEFINED BASED ON TECHNOLOGY PROVIDER (VENDOR) BEST PRACTICES (BP)?<br>-HAS RECOVERY PROCEDURE DOCUMENTATION (RPD) BEEN CREATED & SUCCESSFULLY EXECUTED?<br>-DOES RECOVERY STRATEGY SUPPORT DEFINED RECOVERY TIME OBJECTIVES? | N/A<br><br>2 | -YES TO ALL=3<br>-YES TO STRATEGY OR/AND RPD=2<br>-ALL OTHERS=1 |
| DATA RESTORATION SOURCE–WHAT IS THE DATA RESTORATION SOURCE?<br>-DISK<br>-TAPE<br>-BOTH | 2 | -ALL DISK=3<br>-GREATER THAN 75% DISK=2<br>-ALL OTHER=1 |
| INFRASTRUCTURE ASSESSMENT | N/A | |
| TIER 0/CORE INFRASTRUCTURE–DOES THE CLIENT HAVE STRONG DOCUMENTATION [SYSTEM DIAGRAMS, NETWORK DIAGRAMS, PPT DOCS...] DETAILING THEIR NETWORK AND ESSENTIAL INFRASTRUCTURE INCLUDING (ACTIVE DIRECTORY STRUCTURE, DOMAIN CONTROLLER(S)/DESIGN, DNS, ROUTER, LOAD BALANCERS, FIRE WALLS,...) | 1 | -STRONG TIER 0 DOCUMENTATION, INCLUDING NETWORK WITH CLEAR CLIENT ADMINISTRATION/OWNERSHIP=3<br>-STRONG TIER 0 DOCUMENTATION, INCLUDING NETWORK=2<br>-LITTLE OR NOW TIER 0 DOCUMENTATION=1 |
| APPLICATION RECOVERY ASSESSMENT | N/A | |
| BUSINESS APPS–HAVE ALL APPLICATIONS BEEN IDENTIFIED (TO INCLUDE:)?<br>A) SOFTWARE VERSIONS<br>B) DATABASE VERSIONS<br>C) OPERATING SYSTEMS<br>D) BACKUP SOFTWARE (IF APPLICABLE)<br>F) RECOVERY ORDER | 3 | -YES, ALL QUESTIONS ARE KNOWN BY CLIENT=3<br>-PARTIAL APPLICATION DATA IS KNOWN=2<br>-LITTLE TO NO APP DATA IS KNOWN=1 |
| APPLICATION DEPENDENCY–DOES THE CLIENT KNOW THEIR APPLICATION DEPENDENCIES/<br>EXAMPLE:<br>CLIENT APP #3 REQUIRES 4 SUPPORTING SERVERS TO BE RESTORED IN PRIORITY ORDER (#1 WEB SERVER, #2 APP SERVER, #3 DATABASE SERVER, #4 CONFIGURATION SERVER)–SERVER NEED TO BE GROUPED TO SUPPORT APPLICATIONS, AND THE SERVERS NEED TO BE RECOVERED IN A SPECIFIC ORDER TO SUPPORT APP DEPENDENCY. | 2 | -YES, KNOWS ALL DEPENDENCIES=3<br>-PARTIAL, SOME DEPENDENCY INFORMATION IS KNOWN=2<br>-NO, LITTLE TO NO DEPENDENCY INFORMATION IS KNOWN=1 |

FROM FIG 8-1A

| TECHNOLOGY ASSESSMENT | | |
|---|---|---|
| | N/A | |
| CLIENT TECHNOLOGY MANAGEMENT—HOW DOES THE CLIENT SUPPORT THEIR TECHNOLOGY TODAY? (IN HOUSE, 3rd PARTY SUPPORT, [PARTIAL], COMPLETELY OUTSOURCED) | 3 | —PRODUCTION APPLICATIONS ARE SUPPORTED BY CUSTOMER'S IT TEAM=3<br>—PRODUCTION APPLICATIONS ARE SUPPORTED BY A THIRD PARTY=2<br>—PRODUCTION APPLICATIONS ARE COMPLETELY OUTSOURCED=1 |
| ADVANCED RECOVERY—WHAT SYSTEMS ARE DEPENDENT UPON HIGH AVAILABILITY (CLUSTERING, FAILOVER SYSTEMS) AND ADVANCED REPLICATION STRATEGIES? | 2 | —50% TO 100% OF CLIENT SYSTEMS UTILIZE HA & REPLICATION STRATEGIES=3<br>—25% TO 49% OF CLIENT SYSTEMS UTILIZE HA & REPLICATION STRATEGIES=2<br>—LESS THAN 24% OF CUSTOMER SYSTEMS UTILIZE HA & REPLICATION STRATEGIES=1 |
| PLATFORM ASSESSMENT (ALL CLIENT OWNED PLATFORMS MUST BE SCORED) | N/A | |
| ESX HOST CONFIGURATION—HAS THE CLIENT IMPLEMENTED A "PHYSICAL TO VIRTUAL H/W CONSOLIDATION" REQUIRING "TEMPLATE, GHOST, ISO... RECOVERY" VERSUS A TRUE VIRTUALIZATION ALLOWING FOR VIRTUAL MACHINE DISK (VMDK) BACKUP RESTORATION. | N/A | —REPLICATED VMDK RESTORES=3<br>—BACKED UP VMDKs (E.G. FORM TAPE/DISK)=2<br>—OTHER RESTORE METHODS=1 |
| WINDOWS CONFIGURATION—DOES THE CLIENT UTILIZE WINDOWS DEPLOYMENT AUTOMATION (E.G ACRONIS, BOOT FROM SAN, GHOST...), VIRTUALIZATION (ESX/VMDX), OR A MANUAL INSTALLATION (E.G. CD RECOVERY). | 3 | —VIRTUALIZATION=3<br>—WINDOWS DEPLOYMENT AUTOMATION=2<br>—MANUAL=1 |

*FIG. 8-1B*

| | | |
|---|---|---|
| LINUX CONFIGURATION–DOES THE CLIENT UTILIZE LINUX DEPLOYMENT AUTOMATION (E.G. KICKSTART, MONDO, STORIX, REAR,...), VIRTUALIZATION (ESX/VMDK), OR A MANUAL INSTALLATION (E.G. CD RECOVERY). | N/A | –VIRTUALIZATION=3<br>–LINUX DEPLOYMENT AUTOMATION=2<br>–MANUAL=2 |
| SUN CONFIGURATION DOES THE CLIENT UTILIZE SOLARIS DEPLOYMENT AUTOMATION (E.G. JUMPSTART SERVER), DEPLOYMENT FROM OTHER SOURCE (E.G. FLASH ARCHIVE), OR A MANUAL INSTALLATION (E.G. CD RECOVERY)? | N/A | –JUMPSTART=3<br>–FLAR FROM OTHER SOURCE=2<br>–MANUAL=1 |
| HP-UX CONFIGURATION–DOES THE CLIENT UTILIZE HP-UX DEPLOYMENT AUTOMATION (E.G. IGNITE SERVER), DEPLOYMENT FROM OTHER SOURCE (IGNITE TAPE), OR A MANUAL INSTALLATION (E.G. CD RECOVERY)? | N/A | –IGNITE SERVER=3<br>–IGNITE FROM OTHER SOURCE=2<br>–MANUAL=1 |
| AIX CONFIGURATION–DOES THE CLIENT UTILIZE AIX DEPLOYMENT AUTOMATION (E.G. MKSYSB–[COMMAND TO CREATE BACKUP OF ROOTVG, TO CREATE A BOOTABLE IMAGE OF ALL THE FILE SYSTEMS]; DEPLOYMENT FROM OTHER SOURCE (E.G. NIM–NETWORK INSTALL MGR PROVIDES CENTRAL MGMT FOR INSTALLING AIX IMAGES FOR LPARs & SERVERS. ALLOWS FOR THE CREATION OF A MASTER IMAGE (ALSO CALLED A GOLDEN IMAGE); OR A MANUAL INSTALLATION (E.G. CD RECOVERY). | 1 | MKsysb=3<br>–NIM FROM OTHER SOURCE=2<br>–MANUAL=1 |
| AS400 CONFIGURATION–DOES THE CLIENT SAVE THE LIC AND OS USING SAVSYS DURING BACKUP (E.G. USING IBM's BRMS), INCLUDING *IBM, Q-USER LIBRARIES AND ALL USER LIBRARIES IN A RESTRICTED STATE? SAVSYS & RESTRICTED STATE RESTORE (OPTION 21) [LIC & OS ONLY]=2 OR OS ONLY BKUP=1 (OPTION 23/24) & RESTRICTED STATE RESTORE (OPTION 22) [LIC & OS ONLY]=2 OR OS ONLY BKUP=1 | 1 | SAVSYS & RESTRICTED STATE RESTORE (OPTION 21)=3<br>SAVSYS & RESTRICTED STATE RESTORE (OPTION 22)=2<br>OS ONLY BKUP=1 |
| OTHER PLATFORMS (E.G. MAINFRAME, DEC, TANDEM, UNISYS,...)–PLEASE USE THE SAME THEME IN SCORING 3 TO USE OF DEPLOYMENT AUTOMATION; 2 FOR LESS OPTIMAL "OTHER SOURCE" DEPLOYMENTS TO RECOVER; AND 1 FOR MANUAL. | 1 | |
| LIFE CYCLE MANAGEMENT ASSESSMENT | N/A | |
| CHANGE MANAGEMENT–DOES THE CLIENT HAVE A ROBUST CHANGE MANAGEMENT SYSTEM IN PLACE? | 1 | –CHANGE MANAGEMENT PRACTICE THAT INCLUDES CHANGE ADVISORY BOARD MEETINGS, A CLEAR CHANGE CAPTURE PROCESS AND CHANGE MANAGEMENT TOOLS=3<br>–DEFINED CHANGE MGMT PROCESS WITH REGULAR MEETINGS HELD=2<br>–NO DEFINED PROCESS=1 |
| HIGHEST POSSIBLE SCORING | 36 | |
| VERIFY RMA IS VALID BY ANSWERING AT LEAST 10 QUESTIONS | VALID RMA | |
| TOTAL RMA SCORE | 22 | |
| MATURITY SCORE | 61 | |
| MATURITY LEVEL | LOW | |

FIG. 8-2

RECOVERY MATURITY MODEL (RMM) FOR READINESS-BASED CONTROL OF DISASTER RECOVERY TESTING

BACKGROUND

As Information Technology (IT) systems have become increasingly critical to the smooth operation of an organization, and arguably the economy as a whole, the importance of ensuring continued operation and rapid recovery of those systems has increased. Preparation for recovery of systems involves a significant investment of time and money, with the aim of ensuring minimal loss in the event of a disruptive event.

Prior to selecting a disaster recovery (DR) strategy, a disaster recovery administrator first refers to their organization's business continuity plan which may indicate expected metrics such as a Recovery Point Objective (RPO) or Recovery Time Objective (RTO) for various IT functions (such as payroll, order processing, accounting, manufacturing, etc.). These metrics are then mapped to the underlying systems and infrastructure that support those functions. The DR planner can determine the most suitable recovery strategy for each system.

In many cases, an organization may elect to use an outsourced disaster recovery service provider to provide a stand-by site and systems, rather than using their own facilities, increasingly via cloud computing.

It is often the case that planning for disaster recovery is thus coordinated between an organization's responsible administrator(s) and the outside service provider. These disaster recovery plans are often expensive to devise and it can become difficult for the personnel on both sides, the customer and the service provider, to keep up with rapidly changing computing environments. In one approach, a database can store information on available resources such as replication technologies for implementing disaster recovery plans. The database can include information concerning infrastructure and best practices that should be observed when implementing the disaster recovery plan.

SUMMARY

Even with planning guidance from an outside service provider who specializes in disaster recovery, a given IT production environment may simply not yet be ready for even executing a test of a disaster recovery plan, never mind being ready to successfully accomplish an actual recovery.

In the past, readiness for disaster recovery has been largely measured by executing the disaster plan in a test mode and assessing the resulting success or failure, followed by subsequent actions. The present practice is thus to simply execute multiple tests, and address failures of these tests, until satisfactory test results are obtained.

This ad hoc method of gauging disaster recovery test readiness falls short in several ways.

Customers of the disaster recovery service have no visibility into how far away they truly are from a successful disaster recovery plan.

They often do not have a comprehensive method of identifying remediation necessary to their environment in order to successfully complete a disaster recovery test.

This scenario leads to failed tests without a good understanding of the reasons for failure, an iterative approach guided simply by trial and error.

What is needed is an approach that first determines readiness of an Information Technology (IT) production environment to execute a test of a disaster recovery plan, prior to actually executing or finalizing the plan parameters.

With the approach provided here, a Recovery Maturity Model (RMM) is used to determine whether a particular production environment can be expected, with some level of confidence, to successfully run a disaster recovery test. The RMM provides a quantitative analysis of the production environment in terms of the extent to which best practices are seen to have been implemented in a number of ways. The RMM arranges this analysis as a set of categories for aspects of the production environment and multiple elements for each category. Scoring elements associated with each category/element pair then inform the administrator of one or more criteria and/or actions indicative of successful test execution. A summation of the scoring elements, which may be a weighted summation, results in an overall score indicative of the probability of successful DR test execution.

In more detail, the Recovery Maturity Model (RMM) approach and an optional companion Recovery Maturity Assessment (RMA) can quantitatively measure the readiness of a customer for a disaster recovery service to conduct a disaster recovery test.

The RMM provides specific and targeted quantitative analysis around categories of criteria that the disaster recovery service provider deems necessary for successful test execution within the service provider's domain. The provider of the DR services is typically familiar with the various categories of data processing equipment and elements associated with each. For each combination of data processing system category and element, a set of one or more questions or parameters are developed by the DR service provider. These parameters are then entered into the RMM. The RMM is then executed to individually score and weight each category/element pair, to determine an overall recovery maturity score.

If the weighted sum of the numerical scores is below a defined score, it is determined that the production environment is not likely to be ready for disaster recovery testing. In that instance no disaster recovery test is performed. Rather, a set of recommended actions including industry best practices tailored to the shortcomings in the customer's production environment are provided. The DR service customer may that then implement these actions and iterate the process by executing the Recovery Maturity Model again.

It is only after the Recovery Maturity Model score reaches a predetermined level are disaster recovery readiness tests then permitted to be run.

BRIEF DESCRIPTION OF THE DRAWINGS

The description below refers to the accompanying drawings, of which:

FIGS. 3A-3B is a detailed view of typical Recovery Maturity Model scoring result.

FIGS. 4-1 to 4-5 show details of one example set of scoring instructions used in an RMM for a number of example categories and elements.

FIG. 5 is a typical graphical display that may be used to present the success probability indicator resulting from the RMM.

FIGS. 6-1 and 6-2 are other examples of a trend analysis display that may be presented showing how a particular service customer has improved their RMM score over time.

FIGS. 8-1A, 8-1B and 8-2 illustrate more details of an optional Recovery Maturity Assessment (RMA).

FIGS. 8-1 and 8-2 more details of an optional Recovery Maturity Assessment (RMA).

DESCRIPTION OF AN ILLUSTRATIVE EMBODIMENT

Figure 1:
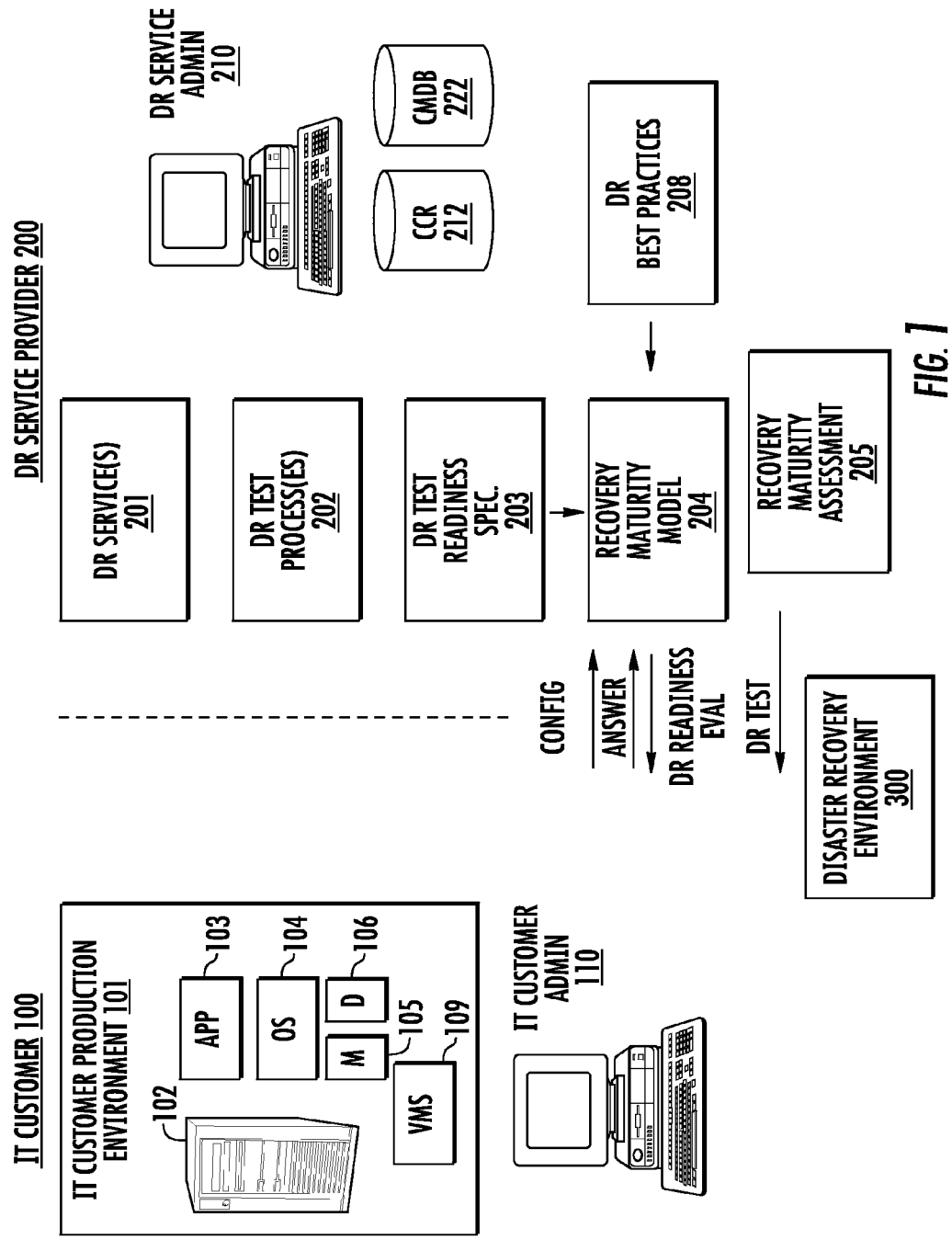
FIG. 1 is a high-level diagram of a typical Information Technology (IT) production environment operated by a customer or potential customer of a Disaster Recovery (DR) Service. This figure also illustrates aspects of a Recovery Maturity Model (RMM) maintained by the DR service provider.

FIG. 1 is a high-level diagram showing a typical information technology (IT) production environment 101 consists of a number of data processing elements. The environment may include a number of physical machines 102 that each may have one or more applications 103, operating systems 104, memory 105, mass storage such as disks 106, and other peripherals (not shown). It is common that production environment 101 may also consist of one or more virtual machines 109 each also considered to have associated applications, operating systems, memory, disks and other peripherals (also not shown).

The production environment 101 has with it an associated operator/administrator 110. The administrator 110 of the production environment 101 has responsibility for Disaster Recovery (DR) planning, and is an existing or potential customer 100 of a Disaster Recovery (DR) service provider 200. DR service provider 200 provides Disaster Recovery (DR) services 201 that support processes, policies and procedures related to preparing for recovery or continuation of operation of the IT infrastructure in the production environment 101 after a natural or human induced disaster.

The DR service provider 200 typically has one or more administrative users 210 that communicate and coordinate with a customer administrator 110. The DR service provider provides disaster recovery test programs 202 that are to be executed by the infrastructure in the production environment 101. DR test processes 202 are typically tailored for the specific attributes of the production environment 101. When executed, the disaster recovery test procedures 202 are run in the production environment 101. It is also common for service providers 200 to provide access to infrastructure in a separate disaster recovery environment 300. For example, a disaster recovery plan might include replication of a storage device 106 to a storage device in disaster recovery environment 300. By executing disaster recovery test processes 202 customer 100 may determine whether or not they are properly prepared to withstand a disaster.

A Customer Configuration Repository (CCR) 212 may typically be part of a Consolidated Management Database (CMDB) 222 that maintains environment configuration information for one or more customers 100 of the service provider 200.

According to teachings herein the service provider 200 also provides test readiness specifications 203 that are indicative of various parameters illustrative of whether or not particular element of the production environment 101 is ready to be subjected to a disaster recovery test 202. These specifications become part of Recovery Maturity Model (RMM) 204 maintained by the service provider 200. Recovery Maturity Model 204 may then request or otherwise obtain information, such as configuration information, from the production environment 101, and analyze this information to come up with a disaster recovery readiness evaluation.

The readiness evaluation is then examined prior to allowing the DR test processes 202 to execute in the production environment 101. As part of this process, best practices information 208 may also be provided to the administrator 110 of the production environment 101. Other optional aspects of the approach may include a simplified Recovery Maturity Assessment 205, executed prior to the recovery maturity model 204.

Figure 2:
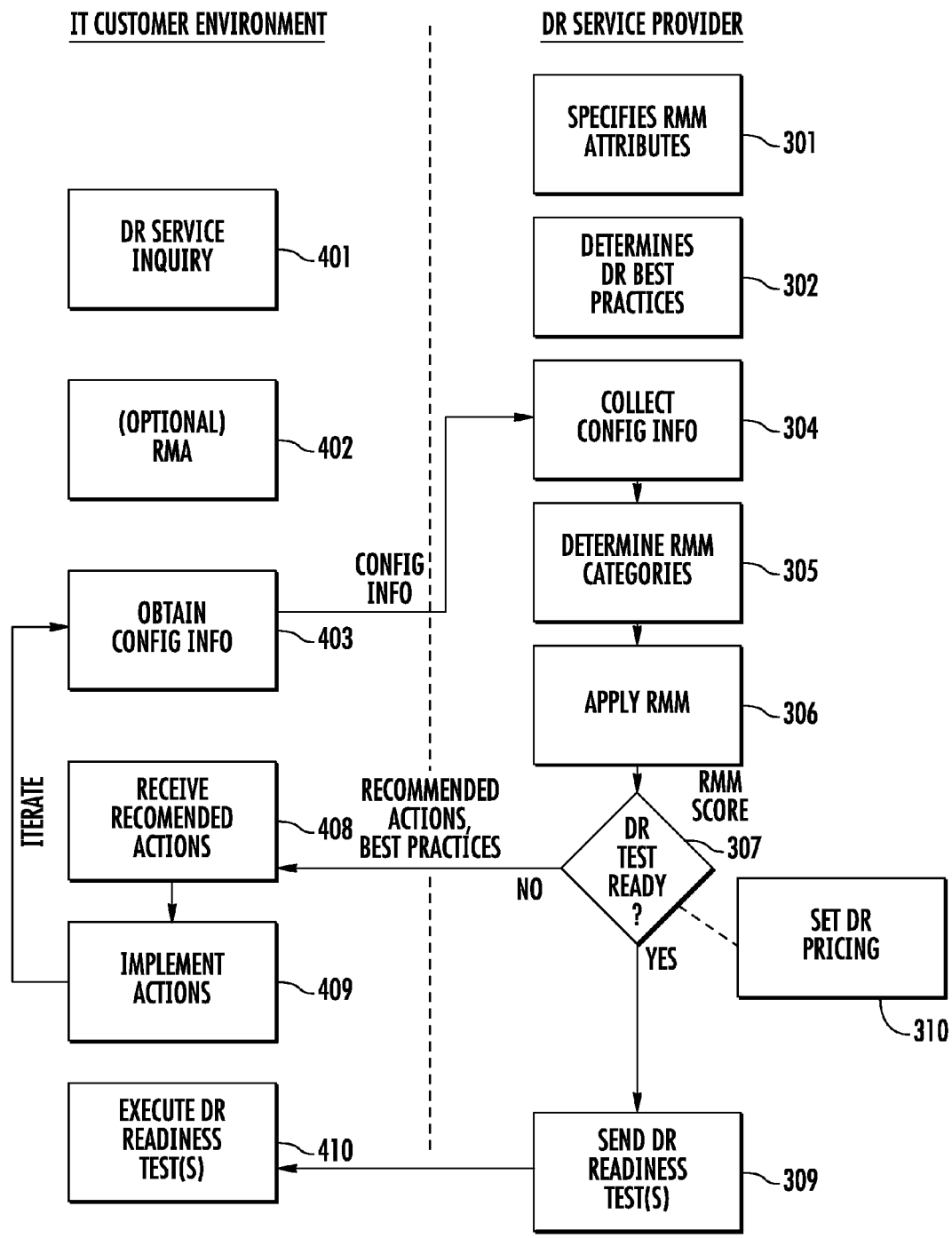
FIG. 2 is a more detailed diagram showing steps performed by the service customer and service provider to implement the Recovery Maturity Model according to the teachings herein.

FIG. 2 is a more detailed view of a sequence of steps performed in the customer environment 101 and by the service provider 200. In a typical scenario, the RMM 204 is implemented as a interactive tool. This may be cooperatively run by one or both of the customer administrator 110 and service provider administrator 210 such as during a consultation or a workshop. The RMM 204 is reviewed, updated, and scored using input from both the customer administrator 110 and provider administrator 210. Subsequent RMM 204 scoring can be performed during, for example, quarterly reviews. or following major upgrades and/or installations to the production environment 101. In this way DR customers 100 are made aware of their progression within the tool 204 and consequently, the impact on their readiness to successfully conduct a disaster recovery test 202.

In a first step the service provider 200 specifies attributes of the recovery maturity model 204. This may include specifications for disaster recovery test 202 readiness as will be discussed in more detail below.

As a subsequent or concurrent step, previously developed disaster recovery best practices information is used as part of RMM 204 assessment in step 302. Subsequently, a customer 100 of the DR service 201 then makes inquiry as to the availability of the service 201.

In state 401, a potential or existing customer of the service provider 200 who is wishing to evaluate the suitability of a new test configuration in their production environment 101. In state 402, an optional Recovery Maturity Assessment may be performed at this stage, but this is not a necessary part of the Recovery Maturity Model process.

As a next step, configuration information is provided from the production environment 101 to the service provider 200. Thus, in state 403 configuration information for the specific production environment 101 is obtained and provided in state 304. The service provider 200 may collect this information manually or through automated processes. Examples of the types of configuration information obtained are discussed in more detail below, but typically include information such as the types of applications running, the backup technologies used, network configurations, virtual machine configurations, physical machine configurations, operating systems, database configurations, and so forth.

Once the configuration information is available, the RMM process can further proceed by determining appropriate categories given the configuration of the production environment 101. With a set of categories determined, an associated set of elements, typically multiple elements for each category, are then identified. The elements each consists of a set of instructions in the form typically of human readable questions that are to be presented to the customer administrator 110 and/or service provider administrator 210. A score is then determined for the answers to each element category pair. These scores may in turn typically be summed and weighted according to a relative importance to arrive at an overall RMM score.

In state 307, depending upon the resulting score, a determination can be made as to whether or not the production environment 101 is ready for disaster recovery testing. If the score is high enough, then in state 309 the disaster recovery tests 202 can be allowed to proceed, and so they can then be executed in state 410.

However back in state 307, if the RMM score was not high enough, then DR testing 202 does not proceed. Rather, a set of recommended actions, which may include identifying one or more best practices as a result of the RMM scoring matrix, may then be provided to and received by the customer 100. From state 408, then recommended actions may then be implemented in state 409 and the configuration collection and providing steps 403 and 304 may again be executed and a new RMM assessment completed.

As part of DR test readiness scoring it is a possible option to set pricing for the disaster recovery service based on the RMM score.

FIGS. 3A-3B are a more detailed view of a Recovery Maturity Model 204. As can be seen, it consists of a matrix of data having rows and columns. The rows or categories are associated with infrastructure aspects of the production environment 101. These may for example include business applications, backup technology, networks, ESX V Center configurations, Windows virtual machines, Windows physical configurations, Linux physical configurations, Linux virtual machines, Sun configurations, HP configurations, AIX configurations, AS/400 configurations, other mainframe configurations, SQL database configurations, and other categories appropriate to the various information technology elements of the production environment 101.

Associated with each category are a number of elements. The elements may consist of CCR/playbook percent completed, backup assessment, recovery strategy defined, customers procedure developed, customer disaster recovery test completeness, knowledge transfer completed, change management, and Recovery Time Objective (RTO)/Recovery Point Objective (RPO) achievable.

These elements are selected typically by the service provider 200 and such a way as they are appropriate for the various categories found for the production environment 100. The goal of the RMM 304 is to determine a maturity score that is a probability indicator for the likelihood of successful disaster recovery test 202. In one implementation, a relatively high score such as 80 or more can indicate a high probability of successful DR test, a maturity score of from 60 to 80 may indicate a lower probability of successful DR tests, and a maturity score of 60 or lower may indicate attention is required prior to even conducting any recovery testing.

In the approach described here each category/element pair is given a numeric quantity as a score (for example, from 1 to 3). The numeric score is based on criteria defined by an associated scoring instruction with each category/element pair. The average of each element is then calculated based on the rating of all categories. In a preferred embodiment, all platforms within the production environment are represented within the RMM 304, although that is not necessary. Categories can also be added as needed.

It is also possible that some category/element pairs may have more than one question. For example in the "network" category, the "recovery strategy defined" element has multiple questions, among them:

Has the recovery strategy been defined for all network devices and segments?

Have the RTO and RPO been clearly stated?

Has the recovery order been stated for all devices and segments?

How well does the strategy aligned with best practices?

Figure 5:
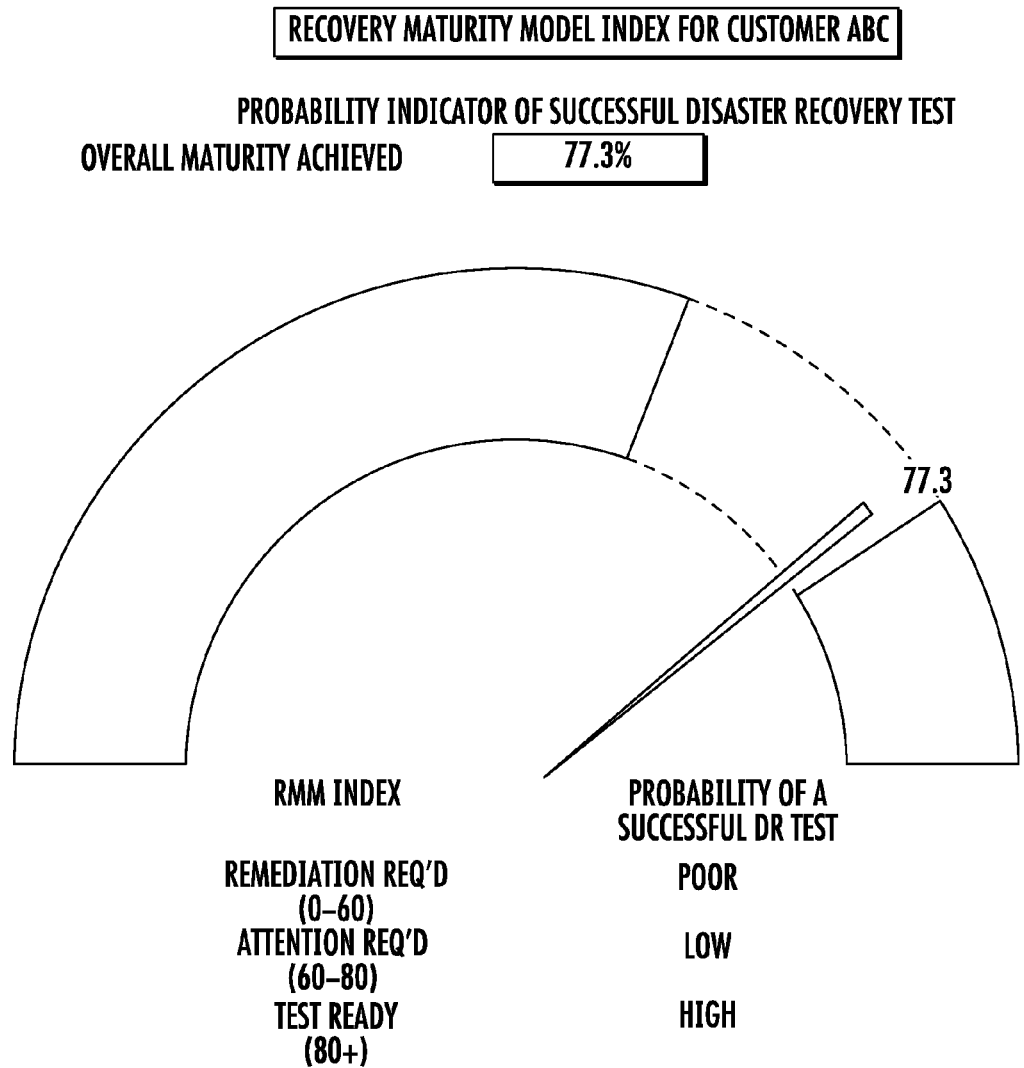

Once answers are provided for the category/element pairs then an overall recovery maturity score can be computed, and displayed to the customer 101. This can be displayed as a simple numerical indicator such as in FIGS. 3A-3B, or may be presented as more of a dashboard model as shown in FIG. 5. The dashboard view can include explaining whether or not remediation is required, just attention is required, or if the DR test is ready to be executed.

Trend line scoring displays may be presented such as that shown in FIGS. 6-1 and 6-2. Here, customer 101 has used with the Recovery Maturity Model 304 over the course of time and has steadily improved their score. Their progress can be tracked by maintaining comments indicating the actions that the customer has taken undertaken (such as attending a workshop, or providing CCR updates to the Solaris Windows AIX platforms, addressing an issue with the AIX server, validating Solaris, etc.). This view can also indicate an improvement in the recovery "strategy for Windows virtualization" and "use of the VMDK for restore" in order to further improve their RMM score.

Now turning attention back to FIG. 2, recall that one of the possible results is that if the RMM score is not high enough, then recommended actions such as in the form of best practices may then be presented to the customer. FIG. 7 is an example screen that may be presented for this purpose. Here, the particular customer in question needs to implement a recovery strategy for their Windows virtualization using the VMDK for restore. The customer could thus select, for example, the VMware best practices option and don't backup best practices options, after which they would be presented with a text readable file to indicate processes and practices they should implement in order improve their score.

FIGS. 8-1A, 8-1B and 8-2 are examples of a Recovery Maturity Assessment that can be executed in some instances prior to the full Recovery Maturity Model. This assessment is tailored for a customer who may not be ready for even a full RMM modeling. The RMA may contain a subset of questions in a simplified format. Thus it may be appropriate to analyze a situation for environments 101 who are not yet customers of the service provider 200.

It is now understood how the RMM can provide specific and targeted qualitative analysis around key disaster recovery test criteria that are necessary to be implemented prior to successful test execution. The resulting RMM index is a quantitative numeric score indicative of a customer's probability of test success, and includes indicia of key things that the service provider knows from past experience will impact DR readiness.

The optional RMA can provide a rough quantitative analysis such as during a sales process, while RMM can provide much deeper analysis after the service has been sold. Both provide potential identification of gaps and corrective actions required in order to successfully achieve a disaster recovery test.

What is claimed is:

1. A method for determining disaster recovery readiness for a data processing environment which includes one or more physical and/or virtual data processing infrastructure elements, and where a disaster recovery (DR) service is capable of providing disaster recovery for the infrastructure elements, the method comprising:

a. storing information in a Recovery Maturity Model (RMM) representing one or more criteria indicative of expected successful DR test execution based on best practices, the RMM further comprising a model associating infrastructure element types with recovery maturity elements, wherein the infrastructure element types include an application type, recovery backup technology, a network type, physical machines operating system(s), virtual machines operating system(s), and physical processor type, and the recovery maturity elements comprise at least a recovery configuration completed, recovery backup assessment, recovery strategy defined, recovery procedure developed, DR kit completeness, Recovery Time Objective achievable, Recovery Point Objective achievable, and knowledge transfer completed;

b. accepting data, via a user interface, representing one or more evaluations of one or more of the criteria specified in the RMM, where the user interface accepts the evaluations as a numerical score for each infrastructure element type and each further recovery maturity element, to thereby determine a matrix of numerical scores;

c. determining if the environment is ready for DR testing by comparing one or more of the evaluation(s) to predetermined information; and d. if the environment is determined to be ready for DR testing, enabling at least one DR test for execution.

2. The method of claim 1 where if a sum of the numerical scores in the matrix is below a defined score, it is determined that the environment is not likely ready for DR testing, and if the sum of numerical scores is above a second defined score, it is determined that the environment is likely ready for DR testing.

3. The method of claim 2 where the sum of the numerical scores is a weighted sum applying a different weight to at least two of the aspects of the RMM.

4. The method of claim 1 additionally comprising:
executing the DR test within a disaster recovery environment that is separate from the production environment.

5. The method of claim 1 additionally comprising:
providing further information related to one or more of the aspects of the RMM if the environment is determined to not be ready for DR testing.

6. The method of claim 5 additionally where:
d. the user interface accepts revised data representing one or more evaluations; and
e. a second step of determining if the environment is ready for DR testing based on the revised data.

7. The method of claim 1 additionally comprising:
before accepting user input for the RMM, performing a Recovery Maturity Assessment that includes a subset of the criteria specified in the RMM.

8. The method of claim 1 where the result of determining if the environment is ready for DR testing is used to set a price for the DR service.

9. The method of claim 1 wherein the aspects of the RMM are each one or more human readable questions.

10. The method of claim 1 wherein for the network type, the recovery maturity element further comprises collecting user input concerning whether the recovery strategy has been defined for all network devices;

the recovery order has been stated for all devices and segments; and how well the strategy is aligned with best practices.

11. A disaster recovery (DR) apparatus for providing disaster recovery for infrastructure elements of a production data processor environment, the DR apparatus comprising:

a. a storage device, for storing information in a Recovery Maturity Model (RMM) representing one or more criteria indicative of expected successful DR test execution, the RMM further comprising a model associating infrastructure element types with recovery maturity elements, wherein the infrastructure element types include an application type, recovery backup technology, a network type, physical machines operating system(s), virtual machines operating system(s), and physical processor type; and the recovery maturity elements comprise at least a recovery configuration completed, recovery backup assessment, recovery strategy defined, recovery procedure developed, DR kit completeness, Recovery Time Objective achievable, Recovery Point Objective achievable, and knowledge transfer completed;

b. a user interface, for accepting data representing one or more evaluations of one or more of the criteria specified in the RMM, where the user interface accepts the evaluations as a numerical score for each infrastructure element type and each further recovery maturity element, to thereby determine a matrix of numerical scores;

c. a processor, executing stored program code for (i) determining if the production environment is ready for DR testing by comparing one or more of the evaluation(s) to predetermined information; and (ii) if the environment is determined to be ready for DR testing, enabling at least one DR test for execution.

12. The apparatus of claim 11 where the processor is further for determining if a sum of the numerical scores in the matrix is below a defined score, and if so, for determining that the environment is not likely ready for DR testing, and if the sum of numerical scores is above a second defined score, determining that the environment is likely ready for DR testing.

13. The apparatus of claim 11 wherein the processor further:

provides additional further information related to one or more of the aspects of the RMM if the environment is determined to not be ready for DR testing.

14. The apparatus of claim 11 wherein the aspects of the RMM are each one or more human readable questions.

15. The apparatus of claim 11 wherein for the network type, the recovery maturity element further comprises collecting user input concerning whether the recovery strategy has been defined for all network devices;

the recovery order has been stated for all devices and segments; and how well the strategy is aligned with best practices.

* * * * *

UNITED STATES PATENT AND TRADEMARK OFFICE
CERTIFICATE OF CORRECTION

PATENT NO. : 9,208,006 B2  
APPLICATION NO. : 13/792713  
DATED : December 8, 2015  
INVENTOR(S) : Steven Jones et al.

Page 1 of 1

It is certified that error appears in the above-identified patent and that said Letters Patent is hereby corrected as shown below:

In the Specification:

Insert the following in Col. 3 after line 6:

--Figure 7 is an example screen that may be presented to a service customer to obtain further information concerning best practices and improve their RMM score.--

Delete the following in Col. 3, lines 9-10:

"FIGS. 8-1 and 8-2 more details of an optional Recovery Maturity Assessment (RMA)"

Signed and Sealed this
Fifteenth Day of March, 2016

Michelle K. Lee
*Director of the United States Patent and Trademark Office*